(12) United States Patent
Oka

(10) Patent No.: US 7,734,147 B2
(45) Date of Patent: Jun. 8, 2010

(54) INFORMATION RECORDING CONTROL APPARATUS AND FILE RECORDING CONTROL METHOD

(75) Inventor: Takeshi Oka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1025 days.

(21) Appl. No.: 11/317,727

(22) Filed: Dec. 23, 2005

(65) Prior Publication Data

US 2006/0140576 A1    Jun. 29, 2006

(30) Foreign Application Priority Data

Dec. 27, 2004    (JP)    ............................ P2004-375337

(51) Int. Cl.
*H04N 5/91*    (2006.01)
*H04N 5/00*    (2006.01)
(52) U.S. Cl. ......................................... 386/83; 386/125
(58) Field of Classification Search .................... 386/83, 386/125, 124, 46, 45, 107, 117
See application file for complete search history.

(56) References Cited

U.S. PATENT DOCUMENTS 7,379,102 B2 *    5/2008    Nakama ................... 348/231.1

FOREIGN PATENT DOCUMENTS

| JP | 2002 237169 | 8/2002 |
|---|---|---|
| JP | 2004 21786 | 1/2004 |
| JP | 2004 120038 | 4/2004 |

OTHER PUBLICATIONS

Akihiko Toyoshima, Record and playback management system, Collection of Sony technical bulletin, Sony Corporation, Apr. 12, 2004, vol. 13, No. 4, p. 2004-0177 (1-10).

* cited by examiner

*Primary Examiner*—Robert Chevalier
(74) *Attorney, Agent, or Firm*—Frommer Lawrence & Haug LLP; William S. Frommer; Thomas F. Presson

(57) ABSTRACT

An information recording control apparatus that automatically selects a recording device at the time of file recording. In response to a file recording request from a terminal apparatus and in accordance with the device information about recording devices, which is stored in a management information database, and the attribute information about a file, which is received from a terminal apparatus, an information recording control apparatus searches for a recording device available for recording from among a plurality of recording devices, and selects a recording device for use in recording. The information recording control apparatus changes the status of the selected recording device so that no other recording operation is performed, and transmits the information for identifying the selected recording device to the terminal apparatus. The terminal apparatus sets the recording device designated by the information recording control apparatus as the recording destination, and begins to transmit the file. The selected recording device records the received file on an inserted recording medium.

6 Claims, 5 Drawing Sheets

FIG. 2

| ID | FORMAT | REMAINING RECORDING CAPACITY | STATUS | RECORDED FILE INFORMATION | | | |
|---|---|---|---|---|---|---|---|
| | | | | FILE COUNT | FILE NAME | UMID | FORMAT | ... |
| 0001 | IMX<br>DV | 20GB | IDLE | 3 | C0001.mxf<br>C0002.mxf<br>C0003.mxf | xxx<br>yyy<br>zzz | IMX<br>DV<br>IMX | ... |
| 0002 | DV | 17GB | WAITING FOR RECORDING FROM TERMINAL XXX | 2 | C0001.mxf<br>C0002.mxf | 1xx<br>2yy | DV<br>DV | ... |
| 0003 | HD MPEG-LONG | 22GB | RECORDING FROM TERMINAL YYY | 0 | | | | |
| ... | ... | ... | ... | ... | ... | ... | ... | ... |

… (1)

INFORMATION RECORDING CONTROL APPARATUS AND FILE RECORDING CONTROL METHOD

CROSS REFERENCES TO RELATED APPLICATIONS

The present invention contains subject matter related to Japanese Patent Applications 2004-375337 filed in the Japanese Patent Office on Dec. 27, 2004, the entire contents of which being incorporated herein by reference.

BACKGROUND OF THE INVENTION

The present invention relates to an information recording control apparatus and file recording control method for properly recording files in a plurality of recording devices connected to a network.

In the past, a video camera for shooting a subject to acquire video data and a recording reproducing apparatus or other broadcast device for recording or reproducing shot image data were interconnected via an SDI (Serial Digital Interface) or other synchronous interface to transmit and receive files.

Recently, broadcast devices have improved, for instance, by incorporating an IEEE (Institute of Electrical and Electronic Engineers) 1394 terminal to support an asynchronous network such as a LAN (Local Area Network). The support for asynchronous networks has made it easy to exchange AV (Audio/Video) data files, which contain video data and audio data, between a remote device and a local device. Further, a file format such as the MXF (Material Exchange Format) is standardized so that AV data files can easily be exchanged between different models of devices and between different makes of devices. A technology for connecting a plurality of audio/video devices to a network and managing the audio/video devices is disclosed by Japanese Patent Laid-open No. Hei 10-164820.

A conventional video recording reproducing system will now be schematically described. FIG. 4 illustrates a typical configuration of a conventional video recording reproducing system 100. The video recording reproducing system 100 includes a studio 50 and terminal apparatuses 60A, 60B, . . . , which are connected via a network 61. The studio includes, for instance, recording devices 51A, 51B, 51C, . . . , an editing apparatus 52, and a communication section 54, which are interconnected via a LAN or other network 53. The communication section 54 controls the communication between network 61 and network 53.

The recording devices 51A, 51B, 51C, . . . use a removable recording medium such as a magnetic tape or optical disk, and record input AV data files on the removable recording medium. A hard disk or other fixed medium may be used as a recording medium for the recording devices 51A, 51B, 51C, . . .

A common computer, such as a personal computer, may be used as the editing apparatus 52, which includes a communication section that is capable of establishing communication via network 61. The editing apparatus 52 can read AV data files stored in the recording devices 51A, 51B, 51C, . . . , edit the AV data files, and write the edited AV data files into the recording devices 51A, 51B, 51C.

The terminal apparatuses 60A, 60B, . . . are used, for instance, for recording, reproducing, or editing video camera data or other video data. These apparatuses include a communication section that is capable of establishing communication via network 61.

The recording devices 51A, 51B, 51C, . . . exchange AV data files with the editing apparatus 52 and terminal apparatuses 60A, 60B, . . . The terminal apparatuses 60A, 60B, . . . store AV data, which is obtained, for instance, as a result of shooting or editing, into a file, and transmit the file to the recording devices 51A, 51B, 51C, . . . via network 61.

In the conventional video recording reproducing system 100, AV data file transmission/reception via network 61 is executed directly between the terminal apparatuses 60A, 60B, . . . and recording devices 51A, 51B, 51C, . . . When, for instance, terminal apparatus 60B is to transmit an AV data file to recording device 51A, a file transmitting person verifies that recording device 51A is available for recording by checking the free space remaining on the recording medium inserted into recording device 51A and the internal status such as the format that recording device 51A can handle for recording purposes. Further, the file transmitting person selects recording device 51A as a recording destination for terminal apparatus 60B, and then transmits the AV data file. If recording device 51A is not available for recording, the file transmitting person checks the internal status of another recording device, such as recording device 51B, verifies that recording device 51B is available for recording, and transmits the AV data file.

SUMMARY OF THE INVENTION

In the above situation, the file transmitting person has to grasp in advance the status of recording device 51A and the address of recording device 51A within network 61. More specifically, the file transmitting person has to check in advance whether recording device 51A supports the format of the transmitted AV data file and whether the recording medium inserted into recording device 51A has an adequate recording space for the size of the transmitted AV data file. Further, the file transmitting person has to perform recording destination setup at terminal apparatus 60B. Therefore, the file transmitting person has to perform troublesome tasks.

Further, if recording device 51A, which is set as the recording destination for terminal apparatus 60B, is not available for recording, the file transmitting person has to wait until recording device 51A becomes available for recording or, if there are a plurality of recording devices (51A, 51B, 51C, . . . ) within network 13, has to search for a recording device available for recording. As a result, the file transmitting person has to take a lot of trouble to achieve file transmission.

Moreover, if, for instance, recording device 51B is found to be available for recording as result of searching a recording device, it is necessary to change the recording destination, which is set for terminal apparatus 60B, from recording device 51A to recording device 51B. Accordingly, the file transmitting person has to perform a troublesome task.

FIG. 5 shows a method that is conceived to solve the above problems. As indicated in FIG. 5, an AV data recording system 200 includes a file server 72, which is provided within a studio 70. All AV data files transmitted from terminal apparatuses 60A, 60B, . . . via network 61 are transferred to the file server 72. The file server 72 then distributes the AV data files to recording devices 51A, 51B, 51C, . . . However, when all the AV data files are transferred to the single file server 72, the load is concentrated on the file server 72. Thus, it is necessary to furnish a high-performance file server 72 that is capable of handling heavy load. As a result, the problem arises that the cost is increased.

To handle AV data files, which are generally large in size, the file server 72 has to use a recording medium having a large capacity. It means that the cost is increased, and that it takes a lot of trouble to manage the file server 72.

Further, a different recording medium might be used eventually depending on the employed file format and the purpose of recording. In such a situation, the AV data files distributed to the recording devices by the file server 72 are recorded again in another recording device. It also makes the task troublesome to be performed.

The present invention has been made in view of the above circumstances and provides an information recording control apparatus and file recording control method for properly recording AV data files in a plurality of recording devices connected to a network.

In solving the above problems, according to an embodiment of the present invention, there is provided an information recording control apparatus including: a status monitoring section for acquiring device information about a plurality of recording devices connected via a network and storing the acquired device information in a management information database; a file attribute information acquisition section, which, when a recording request for a file is issued from a file transmission source connected to a network, acquires attribute information about the file designated by the recording request via the network; and a selection section for selecting a recording device for recording the file designated by the recording request from among a plurality of recording devices in accordance with the attribute information about the file and the device information about a plurality of recording devices, which is stored in the management information database.

According to an embodiment of the present invention, there is also provided a file recording control method including the steps of: monitoring a status to acquire device information about a plurality of recording devices connected via a network and to store the acquired device information in a management information database; acquiring a file attribute information, which, when a recording request for a file is issued from a file transmission source connected to a network, acquires attribute information about the file designated by the recording request via the network; and selecting a recording device for recording the file designated by the recording request from among a plurality of recording devices in accordance with the attribute information about the file and the device information about a plurality of recording devices, which is stored in the management information database.

As described above, when a file is to be recorded from a terminal apparatus to a recording device, the present invention selects a recording device available for recording in accordance with the device information, which indicates the internal status of each of a plurality of recording devices, and the attribute information about the file. Therefore, the file transmitting person does not have to grasp the internal status of each recording device in advance.

When a file is to be recorded from a terminal apparatus to a recording device, the present invention selects a recording device available for recording in accordance with the device information that indicates the internal status of the recording device. Therefore, the file transmitting person does not have to grasp the internal status of the recording device in advance.

The present invention records a file in a recording device that is designated by the information recording control apparatus. Therefore, the file transmitting person does not have to select a proper recording device from a plurality of recording devices.

When the information recording control apparatus designates a recording device, the present invention automatically sets the recording destination for a terminal apparatus. Therefore, the file transmitting person does not have to set the recording destination for the terminal apparatus.

The present invention records files in a plurality of recording devices. Therefore, it is not necessary to furnish a file server or the like.

In the present invention, the information about recording devices and the information including the UMID (Unique Material IDentifier) of files recorded in the recording devices are managed as the same management information database. Therefore, the present invention makes it easy to retrieve and reuse recorded files.

As described above, the present invention acquires the device information, which indicates the internal status of each recording device. In accordance with the device information and the attribute information about a file transmitted from a terminal apparatus, the present invention automatically selects a proper recording device. Therefore, the file can be recorded without causing the file transmitting person to search for the recording destination.

BRIEF DESCRIPTION OF THE DRAWINGS

FIG. 2 is a table illustrating typical device information about a recording device, which is stored in a management information database;

DETAILED DESCRIPTION OF THE PREFERRED EMBODIMENT

One embodiment of the present invention will now be described. In an embodiment of the present invention, the information about the internal status of each of a plurality of recording devices connected to a network is acquired. The acquired information indicates, for instance, whether a recording device is available for recording, the format for recording, and the recording capacity of a recording medium inserted into the recording device. When a request for recording an AV data file is issued via a network, an appropriate recording device is automatically selected in accordance with the information about the internal status of the recording device. The AV data file is then recorded in the selected recording device.

Figure 1:
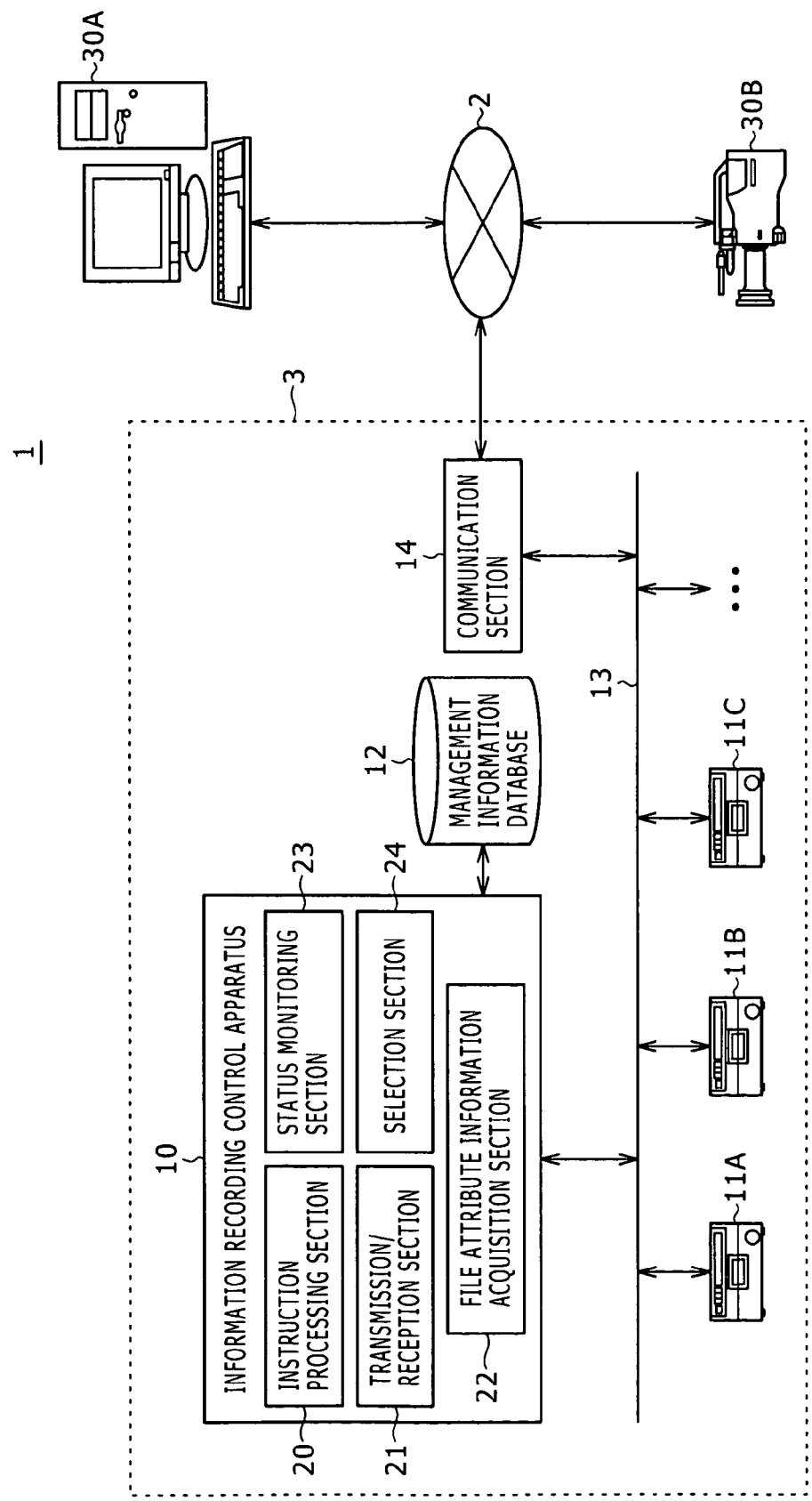
FIG. 1 is a block diagram illustrating a typical configuration of an AV data recording system according to one embodiment of the present invention.

FIG. 1 shows a typical configuration of an information system 1 according to the present embodiment of the present invention. An AV data recording system 1 includes, for instance, a studio 3 and terminal apparatuses 30A, 30B, . . . The studio 3 includes an information recording control apparatus 10, recording devices 11A, 11B, 11C, . . . , a management information database 12, and a communication section 14. The terminal apparatuses 30A, 30B, . . . are a video camera, an editing apparatus, and other device that are connected via a network 2. The terminal apparatuses 30A, 30B, . . . may be located within studio 3 or located, for instance, in another studio, which is separate from studio 3, or at a remote place with the Internet used as network 2. The subsequent description assumes that network 2 is the Internet, and that the terminal apparatuses 30A, 30B, . . . are located far away from studio 3.

An AV data file that is output from the terminal apparatus 30A, 30B, . . . , such as a video camera, is transmitted to the studio 3 via network 2. In the studio 3, the information recording control apparatus 10 references the management information database 12, selects a recording device that is available for recording the received AV data file, and records the received AV data file in the selected recording device.

The configuration of the studio 3 will now be described. The information recording control apparatus 10, recording devices 11A, 11B, 11C, . . . , management information database 12, and a communication section 14, which are provided within the studio 3, are interconnected via the network 13 such as a LAN (Local Area Network). Network 13 uses the TCP/IP (Transmission Control Protocol/Internet Protocol) as the protocol for transmitting information among the connected devices. When the TCP/IP is used, the devices have their own IP addresses, which are unique at least within the studio 3. The communication section 14 controls the communication between network 2 and network 13. Alternatively, however, the communication section 14 may be omitted so as to use a common network instead of the two different networks (network 2 and network 13).

The recording devices 11A, 11B, 11C, . . . use a hard disk or other fixed recording medium. Each input AV data file is recorded such a recording medium. Alternatively, however, the recording devices 11A, 11B, 11C, . . . may use a removable recording medium such as a magnetic tape or optical disk. The subsequent description assumes, for instance, that a hard disk is used as a recording medium for the recording devices 11A, 11B, 11C, . . . . The recording devices 11A, 11B, 11C, . . . have their own identification information so that they can be distinguished from each other. They are provided with a communication section that establishes communication via network 13, and capable of exchanging data and commands with the information recording control apparatus 10, which is connected to network 13.

Further, the recording devices 11A, 11B, 11C, . . . have a function of diagnosing an internal status and can transmit device information to the information recording control apparatus 10 upon receipt of a command from the outside. The transmitted device information indicates the internal status, which includes the information indicating whether recording is available, the format for recording, and the free recording space remaining on the inserted recording medium.

In accordance with a command from the information recording control apparatus 10, the status of the recording devices 11A, 11B, 11C, . . . is controlled. The status of the recording devices 11A, 11B, 11C, . . . is, for instance, "idle," "waiting for recording from terminal XXX," or "recording from terminal YYY." The status changes in accordance with a command from the information recording control apparatus 10. In the "Idle" state, the recording devices 11A, 11B, 11C, . . . can be programmed for file recording. In the "waiting for recording" state, the recording of a certain file is programmed so that no other file can be recorded. In the "recording" state, a file is being recorded on a recording medium. In this state, no other file can be recorded either.

An ordinary computer such as a personal computer can be used as the information recording control apparatus 10. As internal functions, the information recording control apparatus 10 has a status monitoring section 23, a file attribute information acquisition section 22, a selection section 24, an instruction processing section 20, and a transmission/reception section 21. The transmission/reception section 21 exercises communication control via network 13. The instruction processing section 20 generates commands for the recording devices 11A, 11B, 11C, . . . and commands for external devices connected via network 2, and processes commands supplied from the outside.

The status monitoring section 23 gathers the status information and other device information about the recording devices 11A, 11B, 11C, . . . , and stores the gathered device information in the management information database 12. The device information to be gathered includes, for instance, the format information about each recording device, the information about the recording capacity remaining on the recording medium inserted into each recording device, the status information about each recording device, and the recorded file information about recordings on the recording medium inserted into each recording device. For example, the SNMP (Simple Network Management Protocol) may be used as the protocol for gathering the device information. The file attribute information acquisition section 22 acquires the attribute information about an AV data file that is transmitted via network 2.

The selection section 24 references the management information database 12 in compliance with an AV data file recording request from a terminal apparatus 30A, 30B, . . . , and selects a recording device. When, for instance, an AV data file is to be recorded, the selection section 24 selects an appropriate recording device to distribute the loads on the recording devices and prevent the file recording destination from concentrating in a particular recording device.

FIG. 2 shows typical device information about the recording devices, which is to be stored in the management information database 12. The management information database 12 stores the device information about the recording devices 11A, 11B, 11C, . . . , which the status monitoring section 23 acquires from the recording devices. The device information about the recording devices includes, for instance, an "ID (IDentification)" peculiar to a recording device, a "format" in which a recording device can record AV data files, a "remaining recording capacity" that indicates the free recording space remaining on the recording medium inserted into a recording device, a "status" that indicates the status of a recording device, and the "recorded file information" about AV data file recordings on the recording medium inserted into a recording device.

The ID is uniquely assigned to each recording device 11A, 11B, 11C, . . . within the studio 3. When, for instance, network 13 uses the TCP/IP protocol, the IP address relative to network 13 may be used as the ID. Alternatively, a unique serial number may be assigned to each device within the studio 3. The information recording control apparatus 10 uses the ID to identify a recording device. In an example shown in FIG. 2, serial numbers are used as the IDs.

The format is the format of an AV data file that can be recorded in a recording device. For example, the format is a video format such as "IMX (MPEG IMX, registered trademark)," "DV (Digital Video)," or "HD MPEG-LONG (High Definition Moving Picture Experts Group-LONG." The remaining recording capacity indicates the recording capacity remaining on the recording medium currently inserted into a recording device.

The status is information that indicates the state of each recording device. For example, the status is the information indicating the status of a recording device such as "idle," "waiting for recording from terminal XXX," or "recording from terminal YYY." For example, an idle recording device can be selected as a recording destination recording device. The recorded file information is the attribute information about an AV data file that is recorded on the recording medium currently inserted into a recording device. The recorded file information includes, for instance, a file count, file names, UMID (Unique Material IDentifier), and file formats. The UMID is the meta data about AV data or other recording in an AV data file. It is an ID that is assigned to each piece of data and unique within the whole world.

The contents to be recorded as the device information are not limited to this example. For example, a file creation date, file recording time, file title, file bit rate, and other items of information may be recorded as the attribute information about an AV data file.

An operation that an information management system performs for AV data file recording will now be schematically described. In compliance with a file recording request from a terminal apparatus 30A, 30B, . . . and in accordance with the device information about recording devices, which is stored in the management information database 12, and the attribute information about an AV data file, which is received from the terminal apparatus 30A, 30B, . . . , the information recording control apparatus 10 checks the recording devices 11A, 11B, 11C, . . . to locate recording devices that are available for recording, and selects a recording device for use in recording. The information recording control apparatus 10 changes the status of the selected recording device so that it will not be used for other recording operations, and transmits recording device identification information to the terminal apparatus 30A, 30B, . . . The terminal apparatus 30A, 30B, . . . sets the recording device designated by the information recording control apparatus 10 as the recording destination, and starts to transmit the AV data file. The selected recording device then records the received AV data file on the inserted recording medium.

Figure 3:
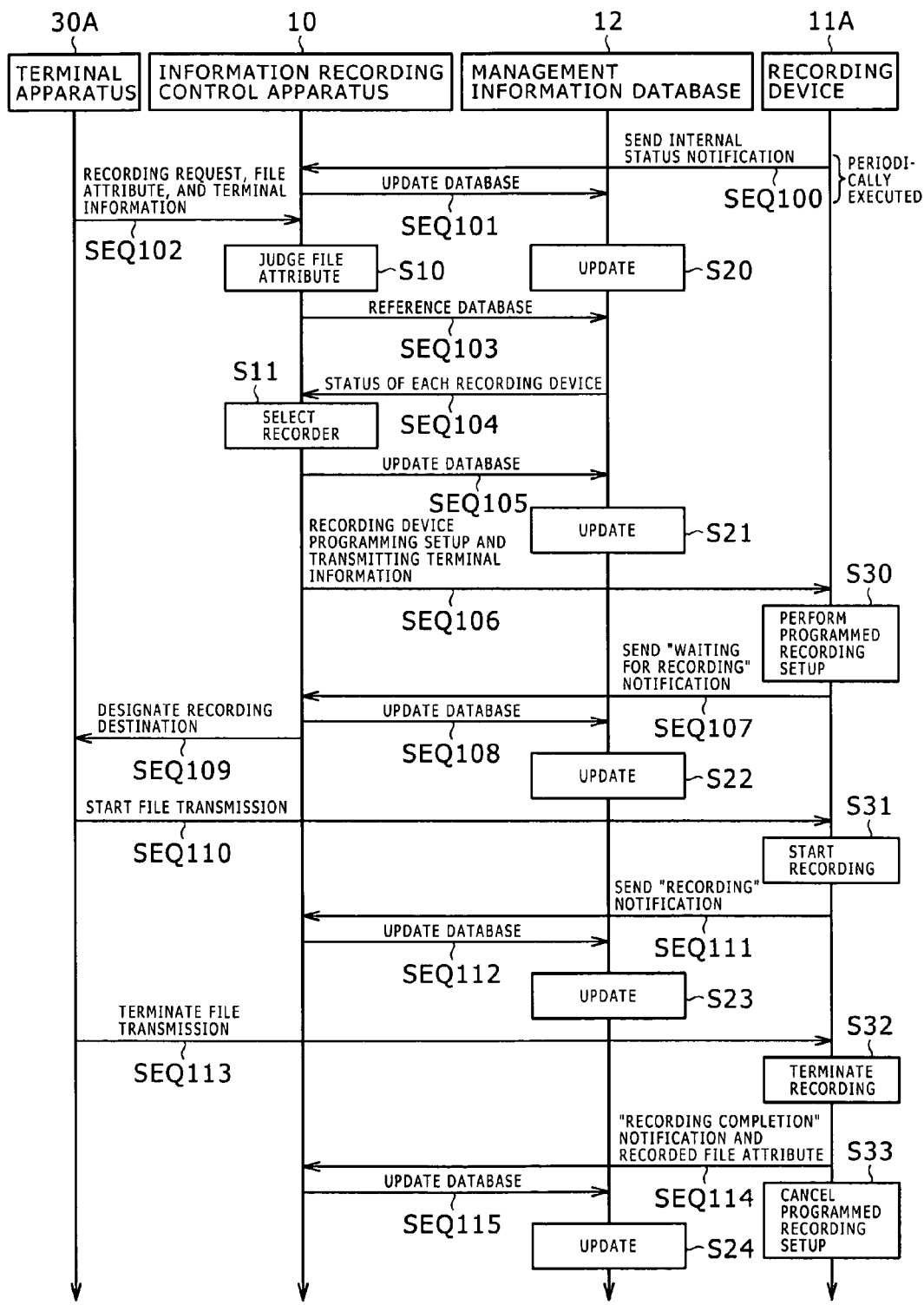
FIG. 3 is a sequence diagram illustrating a typical AV data file recording operation.
Figure 4:
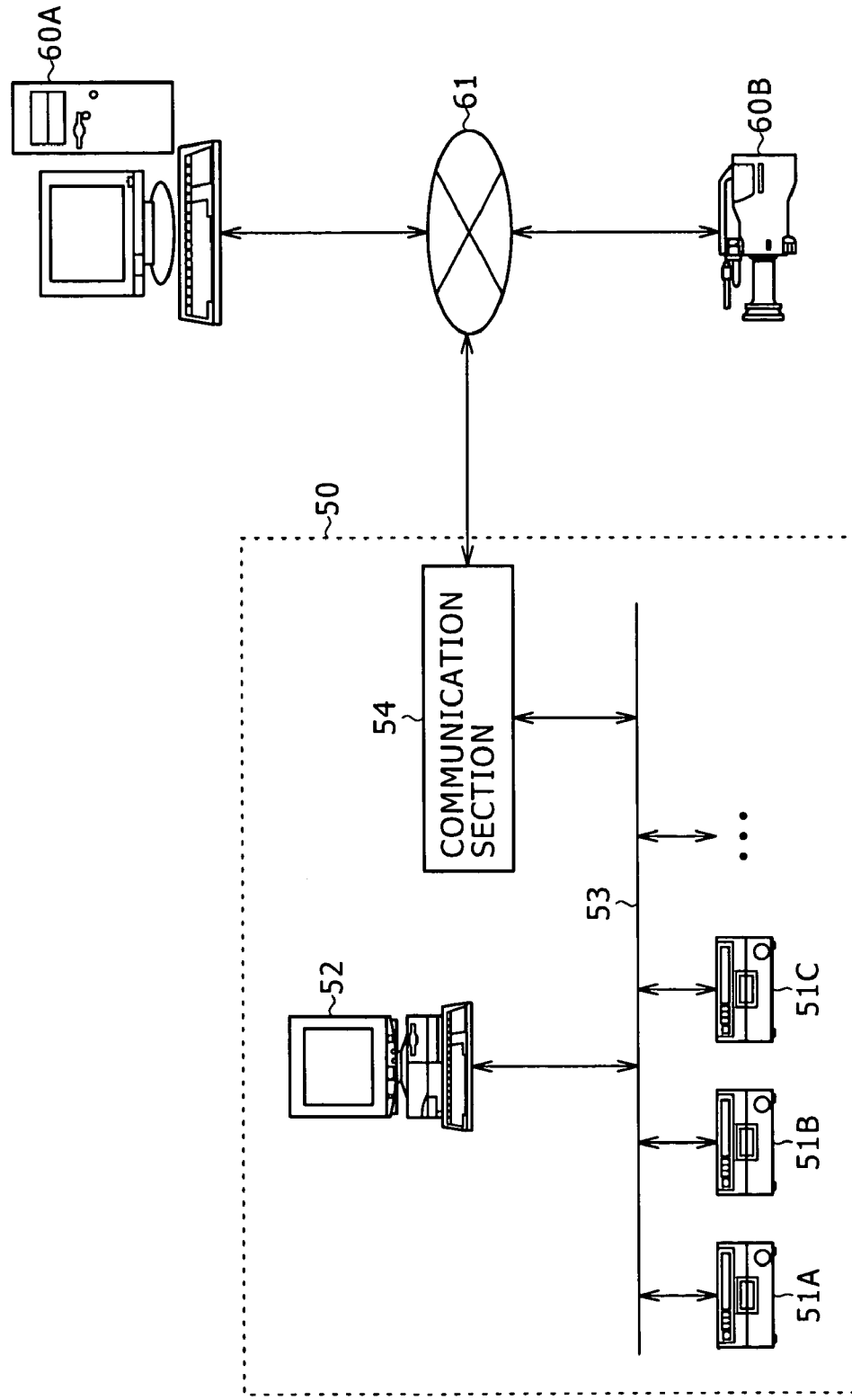
FIG. 4 is a block diagram illustrating a typical configuration of a conventional AV data recording system.
Figure 5:
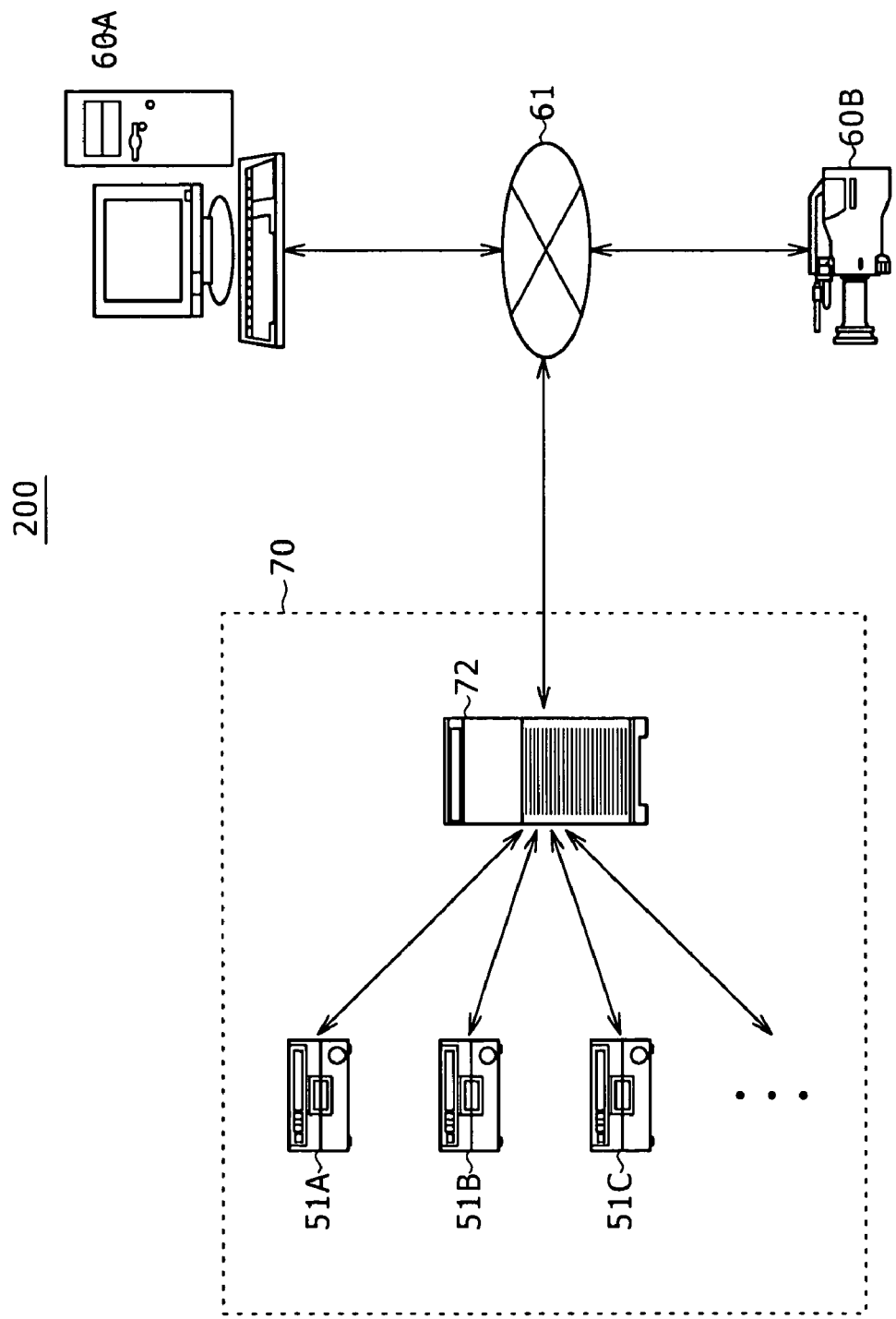
FIG. 5 is a block diagram illustrating a typical configuration of an AV data recording system that uses a file server.

The operation that the information management system performs for file recording purposes will now be described in detail with reference to FIG. 3. For explanation purposes, it is assumed that terminal apparatus 30A records an AV data file in recording device 11A.

In the information recording control apparatus 10, the status monitoring section 23 acquires device information, which indicates the internal status, from the recording devices 11A, 11B, 11C, . . . (sequence SEQ100). In accordance with the acquired device information, the status monitoring section 23 sends a database update request to the management information database 12 (sequence SEQ101). The management information database 12 is then updated in compliance with the request (step S20).

The operations in sequence SEQ100, sequence SEQ101, and step S20 are performed, for instance, on a periodic basis. Therefore, the device information about the recording devices 11A, 11B, 11C, . . . , which is stored in the management information database 12, is kept up-to-date at all times.

Terminal apparatus 30A sends an AV data file recording request to the information recording control apparatus 10. In this instance, the attribute information about the AV data file to be recorded and the information determining the location of terminal apparatus 30A within network 2 such as an IP address or other network address are transmitted together with the request (sequence SEQ102). In accordance with the file attribute information, the information recording control apparatus 10 acquires the file attribute of the AV data file designated by the recording request (step S10).

When the attribute information about the AV data file designated by the recording request is acquired, the information recording control apparatus 10 sends a database reference request to the management information database 12 (sequence SEQ103), and acquires the device information about the recording devices 11A, 11B, 11C, . . . (sequence SEQ104). In accordance with the AV data file attribute information received from terminal apparatus 30A and the device information acquired from the management information database 12, the selection section 24 selects a recording device that is available for recording (step S11). It is assumed herein that recording device 11A is selected.

The recording device selection method employed by the selection section 24 will now be schematically described with reference to FIG. 2. According to FIG. 2, a recording device whose ID is 0001 (which is regarded as recording device 11A) has the IMX and DV formats for recording, has an inserted recording medium whose remaining recording capacity is 20 GB (gigabytes), is in an idle state, and contains three recorded files. The recorded files are a file having a file name of C0001.MXF, a UMID of xxx, and a format of IMX; a file having a file name of C0002. MXF, a UMID of yyy, and a format of DV; and a file having a file name of C0003. MXF, a UMID of zzz, and a format of IMX.

A recording device whose ID is 0002 (which is regarded as recording device 11B) has the DV format for recording, has an inserted recording medium whose remaining recording capacity is 17 GB, is in a "waiting for recording from terminal XXX" state, and contains two recorded files. The recorded files are a file having a file name of C0001. MXF, a UMID of 1xx, and a format of DV and a file having a file name of C0002. MXF, a UMID of 2yy, and a format of DV.

A recording device whose ID is 0003 (which is regarded as recording device 11C) has the HD MPEG-LONG format for recording, has an inserted recording medium whose remaining recording capacity is 22 GB, is in a "recording from terminal YYY" state, and contains zero recorded files.

If, for instance, the received file attribute information indicates that the received AV data file is in the IMX format and 18 GB in file size, the information about the format for recording, which is included in the device information, indicates that only recording device 11A can be selected as a recording device for recording the received AD data file. Further, recording device 11A has a remaining recording capacity of 20 GB while the file size is 18 GB, and is in an idle state. It can therefore be judged that recording device 11A can record the AV data file designated by the recording request. Eventually, recording device 11A is selected as the recording destination for the AV data file designated by the recording request.

If, for instance, the received file attribute information indicates that the received AV data file is in the DV format and 19 GB in file size, the information about the format for recording, which is included in the device information, indicates that recording device 11A whose ID is 0001 and recording device 11B whose ID is 0002 can be selected as a target. Recording device 11A has a remaining recording capacity of 20 GB while the file size is 19 GB, and is in an idle state. Therefore, it can be judged that recording device 11A can record the AV data file designated by the recording request. Meanwhile, recording device 11B has a remaining recording capacity of 17 GB while the file size is 19 GB, and is in a "waiting for recording from terminal XXX" state. It can therefore be judged that recording device 11B cannot record the AV data file designated by the recording request. In this situation, recording device 11A is selected as the recording destination for the AV data file designated by the recording request.

When a recording device is to be selected, the recorded file information about the recording devices 11A, 11B, 11C, . . . may also be referenced. For example, a recording device that has recorded a small number of files may be selected to ensure that AV data files are distributively recorded in a plurality of recording devices.

Although the above description assumes that the format information is first referenced for recording device selection purposes. However, a plurality of items of information need not always be referenced in the above order. For example, the status information may be referenced first.

Returning to FIG. 3, the information recording control apparatus 10 updates the management information database 12 so that the status information about the selected recording device 11A, which is included in the device information, is changed to "waiting to be programmed by terminal apparatus 30A" (sequence SEQ105). The management information database 12 is updated in compliance with a request from the information recording control apparatus 10 (step S21).

The information recording control apparatus 10 not only sends a recording programming request to recording device 11A but also transmits to recording device 11A the information about terminal apparatus 30A, which is the transmission destination for the AV data file that is programmed for recording (sequence SEQ106). In accordance with the programming request and the information about terminal apparatus 30A, which are received from the information recording control apparatus 10, recording device 11A is locked into the "waiting for recording from terminal apparatus 30A" state and put on standby for recording (step S30). Recording device 11A notifies the information recording control apparatus 10 that recording device 11A is in the "waiting for recording from terminal apparatus 30A" state (sequence SEQ107).

In accordance with the "waiting for recording from terminal apparatus 30A" state notification, which is received from recording device 11A, the information recording control apparatus 10 sends an update request to the management information database 12 to change the status of recording device 11A to "waiting for recording from terminal apparatus 30A" (sequence SEQ108). In compliance with the request from the information recording control apparatus 10, the management information database 12 updates the status of recording device 11A (step S22).

The information recording control apparatus 10 transmits the information for identifying the AV data file recording destination, such as the IP address of recording device 11A, to terminal apparatus 30A (sequence SEQ109). In accordance with the information for identifying the recording destination, which is received from the information recording control apparatus 10, terminal apparatus 30A automatically selects recording device 11A as the recording destination for terminal apparatus 30A, and begins to transfer an AV data file to recording device 11A (sequence SEQ110). The AV data file is transferred to recording device 11A via network 2. Recording device 11A changes its status from "waiting for recording from terminal apparatus 30A" to "recording from terminal apparatus 30A", begins to record the AV data file transferred from terminal apparatus 30A (step S31), and notifies the information recording control apparatus 10 that an operation for "recording from terminal apparatus 30A" is in progress (sequence SEQ111).

In accordance with the "recording from terminal apparatus 30A" notification, which is received from recording device 11A, the information recording control apparatus 10 sends an update request to the management information database 12 to change the status of recording device 11A to "recording from terminal apparatus 30A" (sequence SEQ112). In compliance with the request from the information recording control apparatus 10, the management information database 12 updates the status of recording device 11A (step S23).

When the AV data file transfer from terminal apparatus 30A to recording device 11A is performed (sequence SEQ113) to complete the AV data file recording from terminal apparatus 30A to recording device 11A, recording device 11A notifies the information recording control apparatus 10 of "recording completion." At the same time, recording device 11A transmits the attribute information about the recorded AV data file to the information recording control apparatus 10 (sequence SEQ114). Subsequently, recording device 11A performs step S33 to cancel the programmed recording setup, which was performed in step S30.

In accordance with the "recording completion" notification from recording device 11A, the information recording control apparatus 10 sends an update request to the management information database 12 to change the status of recording device 11A to "idle" (sequence SEQ115). In compliance with the request from the information recording control apparatus 10, the management information database 12 updates the recorded file information about recording device 11A (step S24).

If it is judged in step S11 that no recording device is available for recording at the time of recording device selection, the information recording control apparatus 10 can return a proper rejection response to terminal apparatus 30A. In such an instance, terminal apparatus 30A may issue a recording request again after the elapse of a predetermined period of time.

The management information database 12 manages the association between the IDs of the recording devices 11A, 11B, 11C, . . . and AV data file attribute information. Therefore, when an AV data file recorded in a recording device 11A, 11B, 11C, . . . is to be retrieved, an AV data file search can easily be conducted even if a terminal apparatus 30A, 30B, . . . does not know the recording device that is the recording destination for the AV data file transmitted by the terminal apparatus. When the UMID is used in this instance, a desired AV data file can be retrieved with increased ease.

The foregoing description deals with a method for transmitting an AV data file from a terminal apparatus 30A, 30B, . . . to a recording device 11A, 11B, 11C, . . . . However, the terminal apparatuses 30A, 30B, . . . may request the transmission of a desired AV data file stored in a recording device 11A, 11B, 11C, . . . within the studio 3. For example, terminal apparatus 30B, which is an editing apparatus, transmits the attribute information about a desired AV data file for a transmitting request to the information recording control apparatus 10 within the studio 3. In accordance with the received attribute information about the desired AV data file, the information recording control apparatus 10 searches the management information database 12 for a recording device that stores the desired AV data file. As a result of the search, the information recording control apparatus 10 recalls the desired AV data file from the recording device that stores the desired AV data file, and transmits the recalled AV data file to terminal apparatus 30B.

In the present embodiment, which has been described above, the information recording control apparatus 10 transmits the information about a recording destination to a terminal apparatus 30A, 30B, . . . , and the terminal apparatus directly transmits an AV data file to a recording device at the recording destination in accordance with the received information about the recording destination. However, the present invention is not limited to such an embodiment. For example, the recording devices 11A, 11B, 11C, . . . may be rendered invisible to the terminal apparatuses 30A, 30B, . . . so that the studio 3 is configured as a single recording device. More specifically, the AV data file is transmitted to a representative recording destination that is provided for the studio 3. In accordance with the contents of the management information database 12, the selection section 24 of the information recording control apparatus 10 selects a recording device that can record the AV data file, which is transmitted as described above, from among a plurality of recording devices 11A, 11B, 11C, . . . . The information recording control apparatus 10 performs programmed recording and other setup operations for the selected recording device. In this manner, the terminal apparatuses 30A, 30B, . . . can use a fixed recording destination without having to change the recording destination selection.

The foregoing description assumes that the present embodiment is applied to a system that includes broadcast devices. However, the present invention is not limited to such an embodiment. For example, the present invention is also applicable to various other audio/video systems.

It should be understood by those skilled in the art that various modifications, combinations, sub-combinations, and alterations may occur depending on design requirements and other factors insofar as they are within the scope of the appended claims or the equivalents thereof.

What is claimed is:

1. An information recording control apparatus comprising:
a status monitoring section for acquiring device information about a plurality of recording devices connected via a network and storing the acquired device information in a management information database;
a file attribute information acquisition section, which, when a recording request for a file is issued from a file transmission source connected to a network, acquires attribute information about the file designated by the recording request via the network; and
a selection section for selecting a recording device for recording the file designated by the recording request from among a plurality of recording devices in accordance with the attribute information about the file and the device information about a plurality of recording devices, which is stored in the management information database,
wherein the device information includes status information indicating up-to-date information about recording operations being performed at each of the plurality of recording devices.

2. The information recording control apparatus according to claim 1, wherein, in response to the recording request for the file, which is transmitted from the file transmission source, and in accordance with the attribute information about the file, which is transmitted together with the recording request, and the device information about a plurality of recording devices, which is acquired from the management information database, the information recording control apparatus selects a recording device available for recording from among a plurality of recording devices, programs the selected recording device to perform a recording operation, and conveys the information about the selected recording device to the file transmission source, which has issued the recording request.

3. The information recording control apparatus according to claim 1, wherein the status monitoring section automatically acquires the device information about a plurality of recording devices, and updates the contents of the management information database in accordance with the acquired device information.

4. The information recording control apparatus according to claim 1, wherein the device information about a plurality of recording devices and the attribute information about files stored in the recording devices are associated with each other and managed by the management information database.

5. The information recording control apparatus according to claim 1, wherein a rejection response returns when all of a plurality of recording devices are unavailable for recording.

6. A file recording control method comprising the steps of:
monitoring a status to acquire device information about a plurality of recording devices connected via a network and storing the acquired device information in a management information database;
acquiring a file attribute information, which, when a recording request for a file is issued from a file transmission source connected to a network, acquires attribute information about the file designated by the recording request via the network; and
selecting a recording device for recording the file designated by the recording request from among a plurality of recording devices in accordance with the attribute information about the file and the device information about a plurality of recording devices, which is stored in the management information database,
wherein the device information includes status information indicating up-to-date information about recording operations being performed at each of the plurality of recording devices.

* * * * *